United States Patent [19]
Van Herle et al.

[11] Patent Number: 4,550,238
[45] Date of Patent: Oct. 29, 1985

[54] APPARATUS AND METHOD FOR SEALING CAPSULES

[75] Inventors: Louis Van Herle, Zandhoven, Belgium; Fritz Wittwer, Lupsingen, Switzerland

[73] Assignee: Warner-Lambert Company, Morris Plains, N.J.

[21] Appl. No.: 439,514

[22] Filed: Nov. 5, 1982

[51] Int. Cl.⁴ ............................................. B23K 26/00
[52] U.S. Cl. ....................... 219/121 LC; 219/121 LD
[58] Field of Search ................ 219/121 LC, 121 LD, 219/121 LR, 121 LT, 121 LA, 121 LB; 220/DIG. 31, 80, 8; 206/530, 528; 156/272.8, 272.2, 275.3, 275.7; 264/25, 22, 26, 248, 249

[56] References Cited
U.S. PATENT DOCUMENTS

| | | | |
|---|---|---|---|
| 2,977,014 | 3/1961 | Kock | 206/530 X |
| 3,453,097 | 7/1969 | Hafner | 219/121 LG X |
| 3,769,117 | 10/1973 | Bowen et al. | 219/121 LC X |
| 3,920,951 | 11/1975 | Chovan et al. | 219/121 LW |
| 3,960,624 | 6/1976 | Erlandson | 219/121 LA X |
| 4,069,080 | 1/1978 | Osborne | 219/121 LR X |
| 4,172,219 | 10/1979 | Deml et al. | 219/121 LT X |
| 4,281,763 | 8/1981 | Pace | 206/530 |

Primary Examiner—C. L. Albritton
Attorney, Agent, or Firm—Alan H. Spencer; Stephen Raines

[57] ABSTRACT

Apparatus using a coherent mono-chromatic radiation source, preferably using a laser, for bonding capsule elements is disclosed. The systems described include means for providing a spot, short-line, or continuous seam. Also described are methods to enhance the bonding technique which utilize a small quantity of water or plasticol in the region to be bonded.

30 Claims, 3 Drawing Figures

APPARATUS AND METHOD FOR SEALING CAPSULES

BACKGROUND OF THE INVENTION

This invention relates to an apparatus and method for sealing capsules and more particularly using laser radiation sources with means to control the amount of radiation and methods for bonding such capsules.

The capsules utilized in the present invention are hard shell, telescopically joined capsules, having coaxial cap and body parts. The capsules are made of gelatin or other hydrophilic polymer materials whose properties are pharmaceutically acceptable.

While lasers have been used for many years to machine metals, utility in the polymers field has been limited. These limitations with polymers have involved the degregates of the material irradiated; disposition producing a residue; and discoloration of the polymers materials.

BRIEF DESCRIPTION IN DETAIL OF PRESENT INVENTION

The apparatus of the present invention includes a coherent source of mono-chromatic radiation, means, such as mirrors and lenses, to direct the radiation to select portions of hydrophilic capsules, such as gelatin and the like, and for means to control the amount of radiation at selected portions of the capsules. Lasers of helium-neon, carbon dioxide and argon types are suitable. Other laser types capable of providing the necessary energy within desirable time frames may obviously be substituted. The laser may be of the continuous or pulsed laser type, although the pulsed laser is preferred due to the relatively large amount of energy usually required. The pulsed laser may be operated using a control of the Q-switching, mode dumping or cavity dumping type.

Figure 1:
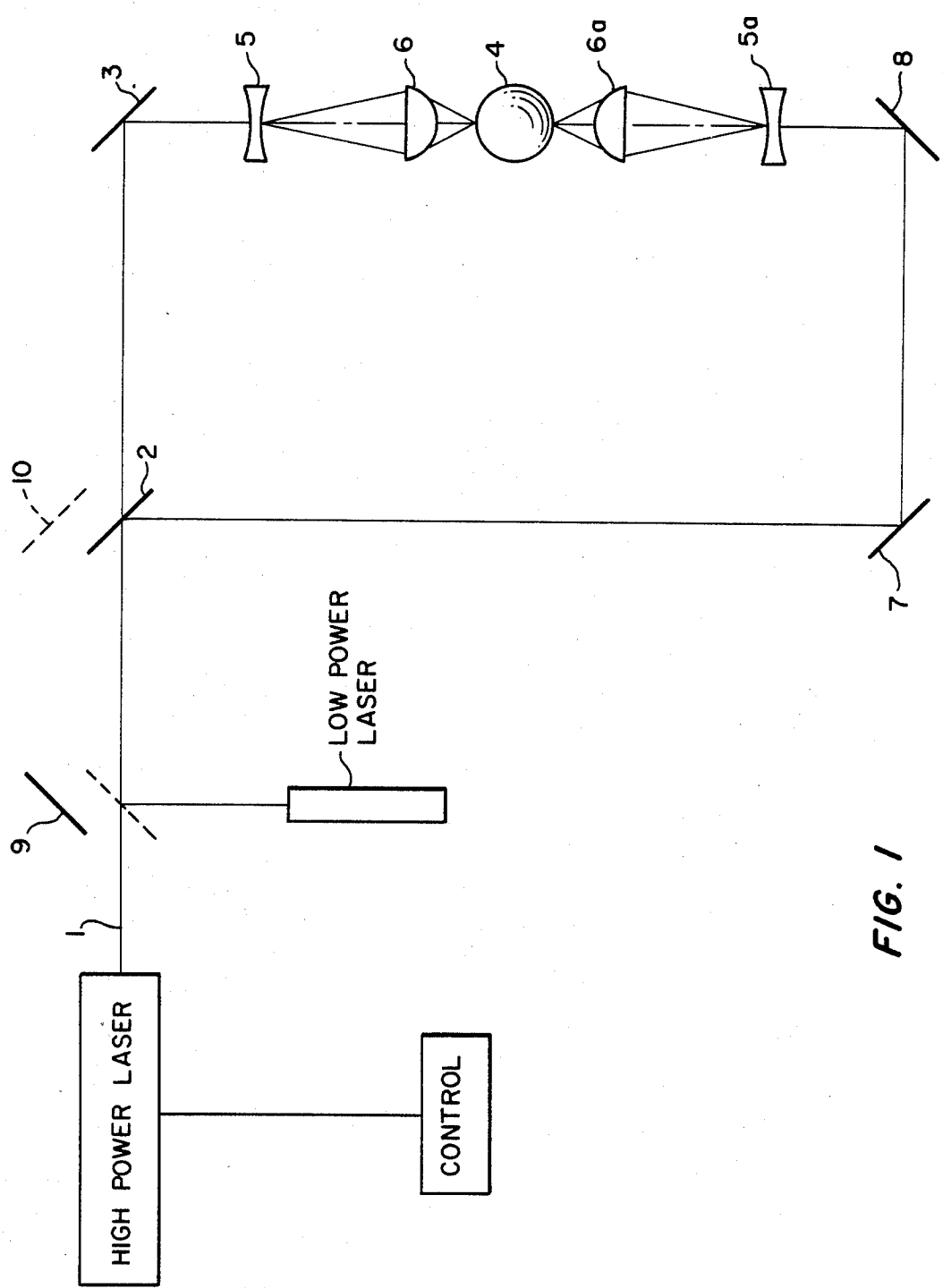
FIG. 1 is a schematic of a preferred system according to the present invention.

Referring to FIG. 1, a high power laser directs a beam 1 of mono-chromatic coherent radiation along an axis. One portion of beam 1 continues through beam splitter 2 and is deflected by mirror 3 toward joined capsule 4. Between mirror 3 and capsule 4, the beam is spread by negative lens 5 and converged along a single meridian by cylinder lens 6. The other portion of beam 1, is reflected by beam splitter 2 and then diverted by mirrors 7 and 8 toward capsule 4. Similarly, negative lens 5a spreads the beam which is then converged along one meridian by cylinder lens 6a. If a pulsed type laser is utilized it may be desirable to utilize a low power laser for alignment of the system. This can be accomplished by moving mirror 9 onto the axis of beam 1 into dotted position. The system, thus described, is suitable for simultaneously bonding a capsule at two points. Alternatively, a mirror 10 could be substituted for beam splitter 2, as illustrated, and alternated between the positions of mirror 10 and beam splitter 2. The bonding would be provided sequentially first along the axis deflected by mirror 3 and then along the axis of mirrors 7 and 8. The power for such apparatus, is regulated through the control by selecting a wattage and energy duration suitable to melt the adjacent surfaces of capsule 4. The lowest energy level sufficient to bond the capsule portions is selected to avoid excessive discoloration of the capsule, deleterious affects of the capsule contents, and/or decomposing the capsule at the bond site which could leave a undesirable residue.

Figure 2:
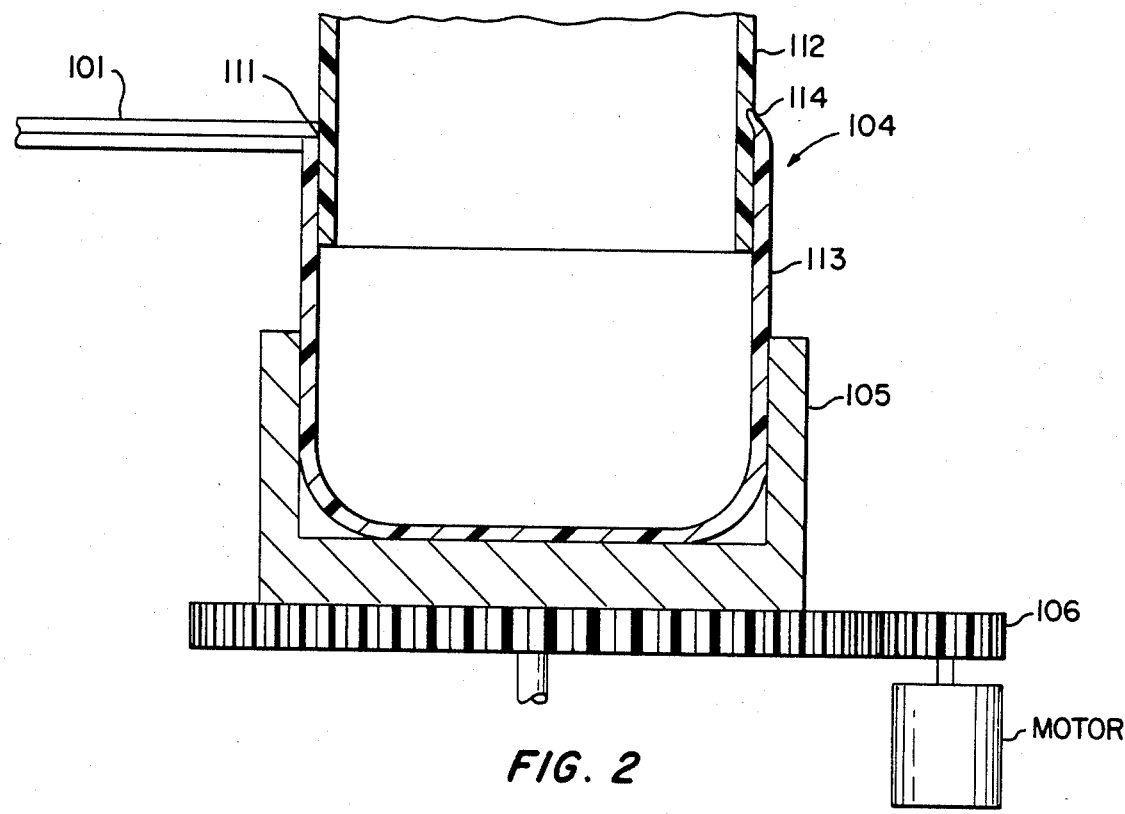
FIG. 2 is a side view, partly in section of a capsule and holder embodiment for providing continuous seams.

Referring to FIG. 2, capsule 104 is supported by holder 105, which in turn is rotated by gear 106 driven by the motor. Laser beam 101, which is directed at joint 111 of capsule components 112 and 113 as capsule 104 is rotated forms seam 114. In the structure shown in FIG. 2, it is not necessary to use the beam deflecting optics shown in FIG. 1 and the laser would normally be operated in the continuous mode.

Figure 3:
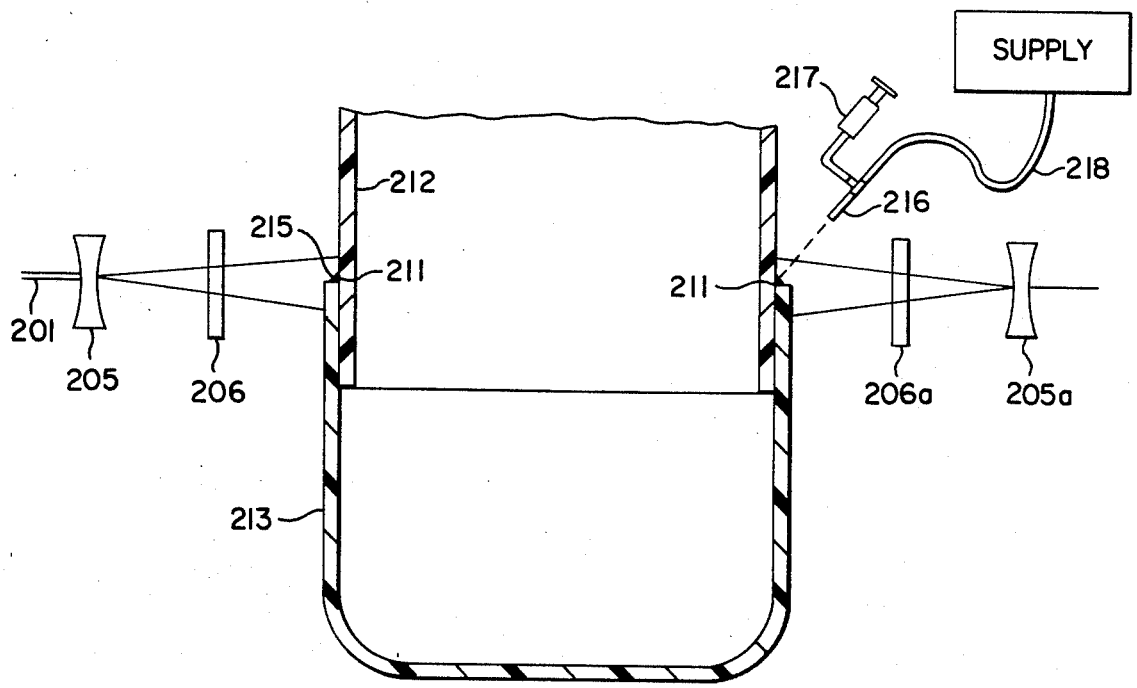
FIG. 3 is a view in cross-section illustrated as a modified structure for the embodiment of FIG. 1.

Referring to FIG. 3 capsule 204 is shown partly in cross-section. Beam 201 is spread by negative lens 205 and converged in one meridian by cylinder lens 206, A small quantity of water or plasticol 215 and 215a is placed at joint 211 by hollow needle 216 which is moved into position by solenoid 217. The liquid supply is connected to needle 216 by flexible tubing 218. The amount and timing of the liquid dispensed is controlled by conventional metering apparatus (not shown). Some of the liquid is drawn by capillary action into the overlapping portion of capsule components of 212 and 213. In Table 1 the melting temperatures of gelatin at given water contents are shown:

TABLE 1

| MELTING TEMPERATURE OF GELATIN AT VARIOUS WATER CONTENTS | |
|---|---|
| Melting Temperature °Celsius | % Water Content |
| 130 | 8 |
| 175 | 10 |
| 88 | 15 |
| 65 | 20 |
| 57 | 25 |
| 52 | 30 |
| 50 | 35 |

Thus if water is used, some gelatin is dissolved to form a thin film of gelatin components 212 and 213 at the adjacent surfaces of joint 211 to significantly reduce by nearly 50% the temperature required to bond this gelatin capsule at the two locations. If a plasticol is used the amount of energy is again significantly reduced, since the energy need only evaporate the solvent.

The energy normally required to bond the capsule components can vary over a considerable range. Normally energy levels of 0.05 to 10 Joules/$MM^2$ are sufficient. Using an argon laser of 280 milliwatts, a satisfactory bond was obtained using apparatus equivalent to that shown in FIG. 1 having a bonded area of 1×7 MM with a 3 to 4 second radiation time. The embodiment of FIG. 2 provided a satisfactory bond using a $CO_2$ laser of 400 milliwatts with a 1 MM circular beam cross-section and a rotation speed of 4 RPM.

We claim:
1. An apparatus for bonding hydrophilic polymer capsule elements which comprises
a source of coherent monochromatic radiation,
an assembled hydrophilic polymer capsule,
means to support said capsule,
means to direct a beam of said radiation at adjacent portions of said elements, and
means to control the amount of raidant energy absorbed by said portion of said elements,
whereby said adjacent portions are bonded.

2. The apparatus of claim 1 wherein said source is a laser.

3. The apparatus of claim 1 wherein said source is a carbon dioxide laser.

4. The apparatus of claim 1 wherein said source is an argon laser.

5. The apparatus of claim 1 wherein said source is a helium neon-laser.

6. The apparatus of claim 1 wherein said means to direct radiation includes reflective surfaces to simultaneously direct said radiation at a plurality of locations on said elements.

7. The apparatus of claim 1 wherein said means to direct radiation includes reflective surfaces to sequentially direct said radiation at a plurality of locations on said elements.

8. The apparatus of claim 1 wherein said means to direct radiation includes means to shape the cross-section of said beam.

9. The apparatus of claim 1 wherein said source is a pulsed laser and said means to control the amount of radiation includes means to vary the pulse duration.

10. The apparatus of claim 1 wherein said source is a pulsed laser and said means to control the amount of radiation includes means to vary the number of pulses.

11. The apparatus of claim 1 wherein the elements are moved.

12. The apparatus of claim 1 wherein said means to control the amount of radiation includes means to control the speed the elements are moved.

13. The apparatus of claim 12 wherein said elements form a gelatin capsule.

14. The apparatus of claim 13 wherein said capsule is rotated.

15. The apparatus of claim 1 further including means to deposit a small quantity of a liquid at the location of said ajacent portions.

16. The apparatus of claim 15 wherein the capsule is gelatin and the liquid is water.

17. The apparatus of claim 15 wherein the liquid is a plasticol.

18. The apparatus of claim 8 wherein the cross-section of the beam is circular.

19. The apparatus of claim 8 wherein the cross-section of the beam is a line.

20. A method of bonding hydrophilic elements which comprises fusing ajacent portions of said elements with a laser beam.

21. The method claim 20 wherein one of said elements carries an absorber of radiation.

22. The method of claim 21 wherein said absorber is selective to the wavelength of said beam.

23. The method of claim 22 wherein said elements overlap.

24. The method of claim 20 wherein said elements have a composition selected from the group consisting of gelatin, crosslinked gelatin, sunflower proteins, soybean proteins, cotton seed proteins, peanut proteins, rape seed proteins; lactose; gum arabic; acrylates; methacrylates; water soluble cellulose and its derivatives including hydroxypropyl cellulose, hydroxypropyl methycellulose, hydroxypropyl methylcellulosephthalate, methylcellulose and sodium carboxymethylcellulose; sodium starch glycolate; acrylic acid polymers; polyvinylpyrrolidone; shellac; polyvinylacetatephthalte; phthalated gelatin; succinated gelatin; and crotonic acid.

25. The method of claim 24 wherein said capsule is gelatin.

26. The method of claim 25 wherein said portions have a water content of about 15% to 50%.

27. The method of claim 26 wherein the water content is about 20%.

28. The method of claim 26 wherein the increased water content lies as a film on the surface of ajacent portions.

29. The method of claim 24 wherein a small quantity of a solution containing said composition is deposited at the location of said adjacent portions.

30. The method of claim 28 wherein said solution is aqueous.

* * * * *